United States Patent
Sebire et al.

(10) Patent No.: US 8,619,608 B2
(45) Date of Patent: Dec. 31, 2013

(54) OTHER RADIO TECHNOLOGY / GERAN INTERWORKING FOR NEIGHBOR CELL MEASUREMENT REPORTING

(75) Inventors: Guillaume Sebire, Espoo (FI); Harri Aatos Jokinen, Pertteli (FI); Antti Olavi Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 245 days.

(21) Appl. No.: 12/989,512

(22) PCT Filed: Apr. 16, 2009

(86) PCT No.: PCT/IB2009/005272
§ 371 (c)(1),
(2), (4) Date: Oct. 25, 2010

(87) PCT Pub. No.: WO2009/130558
PCT Pub. Date: Oct. 29, 2009

(65) Prior Publication Data
US 2011/0039542 A1 Feb. 17, 2011

Related U.S. Application Data

(60) Provisional application No. 61/125,337, filed on Apr. 23, 2008.

(51) Int. Cl.
*H04L 1/00* (2006.01)
*H04L 12/26* (2006.01)

(52) U.S. Cl.
USPC ........................................................ 370/252

(58) Field of Classification Search
None
See application file for complete search history.

(56) References Cited

U.S. PATENT DOCUMENTS 7,706,798 B2 * 4/2010 Hurst ............................ 455/436
8,121,589 B2 * 2/2012 Fischer et al. ................ 455/423

FOREIGN PATENT DOCUMENTS

| CN | 1647417 A | 7/2005 |
| CN | 1868220 A | 11/2006 |
| CN | 1992970 A | 7/2007 |
| GP | WO-2007089128 A1 | 8/2007 |
| WO | 0122759 A1 | 3/2001 |
| WO | WO-0122759 A1 | 3/2001 |
| WO | 2007089128 A1 | 8/2007 |

OTHER PUBLICATIONS

International Search Report and Written Opinion of the International Searching Authority for PCT Application No. PCT/IB2009/005272, dated Jun. 24, 2009, 11 pages.
3GPP TS44.018 V.8.2.0 (Mar. 2008), 3rd Generation Partnership Project, Technical Specification Group GSM/EDGE Radio Access Network; Mobile Radio Interface Layer 3 Specification; Radio Resource Control (RRC) Protocol (Release 8). Paragraphs 9.1.55, 10.5.2.20.

(Continued)

*Primary Examiner* — Ayaz Sheikh
*Assistant Examiner* — Blanche Wong
(74) *Attorney, Agent, or Firm* — Harrington & Smith

(57) ABSTRACT

In accordance with an example embodiment of the present invention, an apparatus places an indication of a wireless communication system cell measurement in a measurement report message, where the indication comprises a corresponding frequency index, and a first part and a second part of an m-bit value representing a physical layer cell identification in a first and a second field, respectively, and a k-bit value representing a measurement result in the second field corresponding to the index. The apparatus then sends the measurement report message to a network interface.

21 Claims, 5 Drawing Sheets

7A: MAKING AN EUTRAN CELL MEASUREMENT

7B: REPORTING THE EUTRAN CELL MEASUREMENT IN A GERAN MEASUREMENT REPORT MESSAGE BY PLACING AN INDICATION OF A CORRESPONDING EUTRAN CENTER FREQUENCY IN A 5-BIT BA INDEX FIELD OF THE MEASUREMENT REPORT MESSAGE AND BY PLACING A 3-BIT MEASUREMENT RESULT AND A 9-BIT PHYSICAL LAYER CELL IDENTIFICATION INTO 6-BIT RXLEV FIELD AND A 6-BIT BSIC FIELD OF THE MEASUREMENT REPORT MESSAGE

(56) References Cited

OTHER PUBLICATIONS

3GPP GP-080668, Measurement Reporting for GERAN/E-UTRAN Inter-working; 3GPP TSG GERAN #38, Malaga, Spain, May 12-16, 2008.

3GPP TS 44.060 V7.0.0 (Jul. 2005) Technical Specification 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7).

3GPP TS 44.018 V.8.2.0 (Mar. 2008), "$3^{rd}$ Generation Partnership Project, Technical Specification Group GSAM/EDGE Radio Access Network, Mobile Radio Interface Layer 3 Specification, Radio Resource Control (RRC) Protocol (Release 8)", Paragraphs 9.1.55, 10.5.2.20, 6 pgs.

3GPP GP-080668, "Measurement Reporting for GERAN/E-UTRAN inter-working", 3GPP TSG GERAN #38, Malaga, Spain, May 12-16, 2008, 7 pgs.

3GPP TS 36.300, V8.3.0 (Dec. 2007), "$3^{rd}$ Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)".

3GPP TS 36.104 V8.1.0 (Mar. 2008), "$3^{rd}$ Generation Partnership Project; Technical Specification Group Radio Access Network; Evolved Universal Terrestrial Radio Access (E-UTRA); Base Station (BS) radio transmission and reception (Release 8)", 52 pgs.

3GPP TS 44.018 V8.20 (Mar. 2008), "$3^{rd}$ Generation Partnership Project; Technical Specification Group GSM/EDGE Radio Access Network; Mobile radio interface layer 3 specification; Radio Resource Control (RRC) protocol (Release 8)", 278 pgs.

3GPP TS 44.060 V8.0.0 (Mar. 2008), "$3^{rd}$ Generation Partnership Project; Technical Specification Group GSM/EDGE Radio Access Network; General Packet Radio Services (GPRS); Mobile Station (MS)—Base Station System (BSS) interface; Radio Link Control/Medium Access Control (RLC/MAC) Protocol (Release 8)", 545 pgs.

3GPP TS 45.008 V7.11.0 (Feb. 2008), "$3^{rd}$ Generation Partnership Project; Technical Specification Group GSM/EDGE Radio Access Network; Radio subsystem link control (Release 7)", 117 pgs.

* cited by examiner

| 8 | 7 | 6 | 5 | 4 | 3 | 2 | 1 | |
|---|---|---|---|---|---|---|---|---|
| | MEASUREMENT RESULTS IEI | | | | | | | OCTET 1 |
| BA-USED | DTX USED | RXLEV-FULL-SERVING-CELL | | | | | | OCTET 2 |
| 3G-BA-USED | MEAS-VALID | RXLEV-SUB-SERVING-CELL | | | | | | OCTET 3 |
| 0 SPARE | RXQUAL-FULL SERVING-CELL | | | RXQUAL-SUB SERVING-CELL | | | NO-NCELL M (HIGH PART) | OCTET 4 |
| NO-NCELL-M (LOW PART) | | | RXLEV-NCELL 1 | | | | | OCTET 5 |
| BCCH-FREQ-NCELL 1 | | | | | BSIC-NCELL 1 (HIGH PART) | | | OCTET 6 |
| BSIC-NCELL 1 (LOW PART) | | | RXLEV-NCELL 2 (HIGH PART) | | | | | OCTET 7 |
| RXLEV NCELL 2 (LOW PART) | BCCH-FREQ-NCELL 2 | | | | | BSIC-NCELL 2 (HIGH PART) | | OCTET 8 |
| BSIC-NCELL 2 (LOW PART) | | | RXLEV-NCELL 3 (HIGH PART) | | | | | OCTET 9 |
| RXLEV-NCELL 3 (LOW PART) | BCCH-FREQ-NCELL 3 | | | | | BSIC-NCELL 3 (HIGH PART) | | OCTET 10 |
| BSIC-NCELL 3 (LOW PART) | | | | RXLEV-NCELL 4 (HIGH PART) | | | | OCTET 11 |
| RXLEV-NCELL 4 (LOW PART) | | BCCH-FREQ-NCELL 4 | | | | | | OCTET 12 |
| BSIC-NCELL 4 | | | | | RXLEV-NCELL 5 (HIGH PART) | | | OCTET 13 |
| RXLEV-NCELL 5 (LOW PART) | | | BCCH-FREQ-NCELL 5 (HIGH PART) | | | | | OCTET 14 |
| BCCH-FREQ-NCELL 5 (LOW PART) | BSIC-NCELL 5 | | | | | RXLEV NCELL 6 (HIGH PART) | | OCTET 15 |
| RXLEV-NCELL 6 (LOW PART) | | | | BCCH-FREQ-NCELL 6 (HIGH PART) | | | | OCTET 16 |
| BCCH-FREQ-NCELL 6 (LOW PART) | BSIC-NCELL 6 | | | | | | | OCTET 17 |

*FIG. 1*

```
<Enhanced Measurement report> ::=
    < RR short PD : bit >                          -- See 3GPP TS 24.007
    < Message type : bit (5) >                     -- See 10.4
    < Short layer 2 header : bit (2) >             -- See 3GPP TS 44.006
    < BA_USED : bit >
    < 3G_BA_USED : bit >
    < BSIC_Seen : bit >
    < SCALE : bit >
    { 0 | 1 < Serving cell data : < Serving cell data struct > > }
    { 1 < Repeated Invalid_BSIC_Information : < Repeated Invalid_BSIC_Information struct > > } ** 0
    { 0 | 1 { 0 | 1 < REPORTING_QUANTITY : bit (6) > } ** }     -- bitmap type reporting
    < spare padding > ;

< Serving cell data struct > ::=
    < DTX_USED : bit >
    < RXLEV_VAL : bit (6) >
    < RX_QUAL_FULL : bit (3) >
    < MEAN_BEP : bit (5) >
    < CV_BEP : bit (3) >
    < NBR_RCVD_BLOCKS : bit (5) > ;

< Repeated Invalid_BSIC_Information struct > ::=
    < BCCH-FREQ-NCELL : bit (5) >
    < BSIC : bit (6) >
    < RXLEV-NCELL : bit (6) > ;
```

*FIG. 2*

OTHER RADIO TECHNOLOGY / GERAN INTERWORKING FOR NEIGHBOR CELL MEASUREMENT REPORTING

RELATED APPLICATION

This application was originally filed as PCT Application No. PCT/B32009/005272 filed Apr. 16, 2009, which claims priority benefit from United States Provisional Application No. 61/125,337, filed Apr. 23, 2008.

TECHNICAL FIELD

The exemplary and non-limiting embodiments of this invention relate generally to wireless communication systems, methods, devices and computer programs and, more specifically, relate to cell measurement and reporting procedures carried out between a mobile device and a network access device.

BACKGROUND

Various abbreviations that may appear in the specification and/or in the drawing figures are defined as follows:

| | |
|---|---|
| 3GPP | Third Generation Partnership Project |
| BSS | Base Station System |
| EDGE | Enhanced Data Rates for Global Evolution |
| GSM | Global System for Mobile communications |
| GERAN | GSM/EDGE Radio Access Network |
| BCCH | broadcast control channel |
| BA | BCCH allocation |
| RXLEV | received signal level |
| BSIC | base station identity code |
| MS | mobile station (also referred to as a UE) |
| UTRAN | universal terrestrial radio access network |
| EUTRAN | evolved UTRAN (LTE) |
| LTE | long term evolution Node B base station |
| eNB | EUTRAN Node B (evolved Node B) |
| UE | user equipment (also referred to as a MS) |
| UL | uplink (UE towards eNB) |
| DL | downlink (eNB towards UE) |
| RLC | radio link control |
| RRC | radio resource control |
| RRM | radio resource management |
| MAC | medium access control |
| FDD | frequency division duplex |
| OFDMA | orthogonal frequency division multiple access |
| SC-FDMA | single carrier, frequency division multiple access |
| PLCID | physical layer cell identification |
| ARFCN | absolute radio frequency channel number |
| EARFCN | E-UTRA absolute radio frequency channel number |
| SACCH | slow associated control channel |
| PACCH | packet associated control channel |
| PDTCH | packet data traffic channel |
| Ncell | neighbor cell |
| NCL | neighbor cell list |

A proposed communication system known as evolved UTRAN (EUTRAN, also referred to as UTRAN-LTE or as E-UTRA) is currently under development within 3GPP. The current working assumption is that the DL access technique will be OFDMA, and the UL access technique will be SC-FDMA.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is attached hereto as Exhibit A and incorporated by reference herein in its entirety.

Another specification document that is of interest herein is 3GPP TS 44.018 V8.2.0 (2008-03) Technical Specification 3rd Generation Partnership Project; Technical Specification Group GSM/EDGE Radio Access Network; Mobile radio interface layer 3 specification; Radio Resource Control (RRC) protocol (Release 8). Of particular interest is sub-clause 10.5.2.20 "Measurement results", and subclause 9.1.55, "Enhanced Measurement Report", attached hereto as Exhibit B and incorporated by reference, as is the entirety of 3GPP TS 44.018 V8.2.0.

Reference may also be made to, for example, 3GPP TS 36.104 V8.1.0 (2008-03) Technical Specification 3rd Generation Partnership Project; Technical Specification Group Radio Access Network; Evolved Universal Terrestrial Radio Access (E-UTRA); Base Station (BS) radio transmission and reception (Release 8), attached hereto as Exhibit C and incorporated by reference in its entirety.

FIG. 1 herein reproduces Figure 10.5.2.20.1, "Measurement Results information element" of 3GPP TS 44.018.

UTRAN FDD measurement reporting has thus far been standardized on the basis of a full neighbor cell list (a so-called "white list", where individual cells are listed with a sufficient identification that is unique within a restricted geographical area). This permits an efficient reference to reported cells by using an index to the cell position in the neighbor cell list.

In the case of LTE interworking, a preference has been indicated for a so-called "black list" that is based on a neighbor cell list (NCL). In this approach the LTE center frequency would be indicated (in practice, the physical layer cell ID (PLCID) and the center frequency would be the minimum amount of information needed to uniquely identify a cell). In certain special cases, such as country border areas, a list of individual cells may be given where "not allowed" cells are indicated. In such a case the MS needs to determine which cells appear at each indicated frequency, and sufficient cell identification then needs to be sent to the network along with the actual measurement results.

The use of the black list implies that the center frequencies and possibly the physical layer cell id of not allowed (disallowed) EUTRAN cells are given in the EUTRAN Neighbor Cell list (NCL). The list can be considered to be black because the MS does not know the identities of the allowed EUTRAN neighbor cells from the NCL. In contradistinction, the use of the white list would imply that the allowed EUTRAN cells were given in the EUTRAN Neighbor Cell list, that is, as a minimum the center frequency and physical layer cell ID for each cell.

In further detail, for the white list approach when a measurement report was made for an EUTRAN Ncell, an index to the Neighboring Cell's entry in the NCL could simply be used, as opposed to having to identify the center frequency and the PLCID. This would result in fewer bits being needed for a measurement report, as compared to the use of the black list. For the white list approach each measurement report for an EUTRAN cell would consist of the NCL Index and the measurement result.

However, if the black list approach is to be used instead each measurement report would require the center frequency (or index), the PLCID and the measurement result. That is, the EUTRAN cell measurement results thus would include the center frequency indication (E-ARFCN, defined in 3GPP TS 36.104), the PLCID and the measurement result per cell. The center frequency may be indicated with, for example, a 3-bit index that refers to a list of EUTRAN center frequencies. A total of 6 bits may be sufficient for the measurement result, and the PLCID would require 9 bits. The implication of this is that approximately 18 bits would be needed for each reported EUTRAN cell.

Discussed now are problems with the MEASUREMENT REPORT and PACKET MEASUREMENT REPORT messages.

Generally, there is an interest in avoiding changes to existing signaling messages if at all possible. As a result, the UTRAN measurement reporting is specified such that the GERAN MEASUREMENT REPORT message (see 3GPP TS 44.018, subclause 10.5.2.20 (Exhibit B herein)) was not changed when the support for UTRAN reporting was standardized.

The details of the Measurement Results information elements are provided in Table 10.5.2.20.1, and are as follows:

---

BA-USED (octet 2), the value of the BA_IND field of the neighbour cell description information element or elements defining the BCCH allocation used for the coding of BCCH-FREQ-NCELL fields. Range 0 to 1.

DTX-USED (octet 2) This bit indicates whether or not the mobile station used DTX during the previous measurement period.

Bit 7
---
0  DTX was not used
1  DTX was used

RXLEV-FULL-SERVING-CELL and RXLEV-SUB-SERVING-CELL, (octets 2 and 3) Received signal strength on serving cell, measured respectively on all slots and on a subset of slots (see 3GPP TS 45.008)

The RXLEV-FULL-SERVING-CELL and RXLEV-SUB-SERVING-CELL fields are coded as the binary representation of a value N. N corresponds according to the mapping defined in 3GPP TS 45.008 to the received signal strength on the serving cell.
Range: 0 to 63
MEAS-VALID (octet 3)
This bit indicates if the measurement results for the dedicated channel are valid or not Bit 7
---
0  The measurement results are valid
1  the measurement results are not valid
3G-BA-USED (octet 3)
The value of the 3G_BA_IND field of the neighbour cell description information element or elements defining the 3G Neighbour Cell list used for the coding of 3G BCCH-FREQ-NCELL fields. Range 0 to 1.
RXQUAL-FULL-SERVING-CELL and RXQUAL-SUB-SERVING-CELL (octet 4)
Received signal quality on serving cell, measured respectively on all slots and on a subset of the slots (see 3GPP TS 45.008)
CELL fields are coded as the binary representation of the received signal quality on the serving cell.
Range: 0 to 7 (See 3GPP TS 45.008)
NO-NCELL-M, Number of neighbour cell measurements (octets 4 and 5)

Bits
---
1 8 7  Neighbour cell measurement result
0 0 0  None
0 0 1  1
0 1 0  2
0 1 1  3
1 0 0  4
1 0 1  5
1 1 0  6
1 1 1  Neighbour cell information not available for serving cell
RXLEV-NCELL i, Result of measurement on the i'th neighbour cell (octet 5, 7, 8, 9, 10, 11, 12, 13, 14, 15 and 16)
If the i'th neighbour cell is a GSM cell, the RXLEV-NCELL field is coded as the binary representation of a value N. N corresponds according to the mapping defined in 3GPP TS 45.008 to the received signal strength on the i'th neighbouring cell. See note 1 & 2.
If the i'th neighbour cell is a 3G cell, the contents of the RXLEV-NCELL field is defined in 3GPP TS 45.008.
Range: 0 to 63.
Report on GSM cells:
BCCH-FREQ-NCELL i, BCCH carrier of the i'th neighbour cell (octet 6, 8, 10, 12, 14, 15, 16 and 17).
The BCCH-FREQ-NCELL i field is coded as the binary representation of the position, starting with 0, of the i'th neighbour cells BCCH carrier in the BCCH channel list. The BCCH channel list is composed of one or two BCCH channel sub lists, each sub list is derived from the set of frequencies defined by reference neighbour cell description information element or elements. In the latter case the set is the union of the two sets defined by the two neighbour cell description information elements.
In each BCCH channel sub list the absolute RF channel numbers are placed in increasing order of ARFCN, except that ARFCN 0, if included in the set, is put in the last position in the sub list. The BCCH channel list consists either of only the sub list derived from the neighbour cell description information element(s) in System Information 2/5 (and possible 2bis/5bis) or of that sub list immediately followed by the sub list derived from the neighbour cell description information element in System Information 2ter/5ter for the case System Information 2ter/5ter is also received. If the set of ARFCNs defined by the reference neighbour cell description information element or elements includes frequencies that the mobile station does not support then these ARFCNs shall be included in the list.

The notation 2/5 etc. means that the rules above apply to the neighbour cell description information elements received in System Information 2, 2bis and 2ter and to those received in System Information 5, 5bis and 5ter separately.
    See note 1 & 2.
    Range: 0 to 31/30.
    Report on 3G cells:
    If no more than 31 (GSM) ARFCN frequencies are included in the BA (list), the index BCCH-FREQ-NCELL 31 indicates report(s) on 3G cells.
    In this case, the corresponding 'BSIC-NCELL' field in FIG. 10.5.2.20.1 carries the index of the i'th 3G neighbour cell in the 3G Neighbour Cell list defined in sub-clause 3.4.1.2.1.1, "Deriving the 3G Neighbour Cell list from the 3G Neighbour Cell Description". 3G cells with indexes above 63 are not reported (6 bits field).
    If more than 31 (GSM) ARFCN frequencies are included in the BA (list), reporting of 3G cells is not possible with this IE.
    Range: 0 to 63.
    BSIC-NCELL i, Base station identity code of the i'th neighbour cell (octet 6, 7, 8, 9, 10, 11, 13, 15 and 17)
    For GSM cells, the BSIC-NCELL i field is coded as the binary representation of the base station identity code of the i'th neighbour cell. See note 1 & 2.
    Range: 0 to 63.

NOTE 1:
If the field extends over two octets the highest numbered bit of the lowest numbered octet is the most significant and the lowest numbered bit of the highest numbered octet is the least significant.
NOTE 2:
If NO-NCELL-M < 6 the remaining RXLEV-NCELL i, BS-FREQ-NCELL i and BSIC-NCELL i fields (NO-NCELL-M < i <= 6) shall be coded with a "0" in each bit.

It can be noted that each neighbor cell report in the GERAN measurement report message consists of 17 bits of information containing: a 6-bit RXLEV_NCELL, a 5-bit BCCH_FREQ_NCELL (containing the BA Index value), and a 6-bit BSIC_NCELL.

The approach taken for reporting 3G/UTRAN cell measurements in the GERAN system was to reserve one BA (BCCH Allocation) index value ('31') to indicate that the reported results are for UTRAN. The GERAN RXLEV field (6 bits) is replaced with the relevant UTRAN measurement result, and the GERAN BSIC field (6 bits) is used to carry an index to the 3G neighbor cell list. This last procedure is made possible because a full white list NCL is used for UTRAN, and thus the use of a simple index to the UTRAN neighbor cell list is made possible.

However, if the above-described black list approach is adopted for reporting EUTRAN cell measurements the 18 bits information as discussed above would need to be carried by the 12 bits of available space (from the RXLEV and BSIC fields) for each report in the measurement results IE (see again FIG. 1) used in the MEASUREMENT REPORT message. As should be appreciated this approach would not be usable even if one were to accept some performance compromise, such as a reduced measurement reporting range.

A similar problem occurs with the PACKET MEASUREMENT REPORT message (see 3GPP TS 44.060, subclause 11.2.9 (Exhibit D)) if no extension of the message is made.

FIG. 2 reproduces Figure 9.1.55.1. "Enhanced Measurement Report message content" of 3GPP TS.44.018, subclause 9.1.55 (see Exhibit B), which is another option for measurement reporting during a circuit switched (CS) connection. The details of the Enhanced Measurement Report (EMR) information elements are provided in Table 9.1.55.1, and are as follows:

BA_USED (1 bit field),
The value of the BA-IND field of the neighbour cell description information element or elements defining the BCCH allocation used. Range 0 to 1.
    3G_BA_USED (1 bit field)
The value of the 3G-BA-IND field of the neighbour cell description information element or elements defining the 3G allocation used. Range 0 to 1.
    BSIC_Seen (1 bit field)
This parameters indicates if a GSM cell with invalid BSIC and allowed NCC part of BSIC is one of the six strongest, see 3GPP TS 45.008.

Bit

0  No cell with invalid BSIC and allowed NCC part of BSIC is seen
    1  One Cell or more with invalid BSIC and allowed NCC part of BSIC is seen
    SCALE (1 bit field)
The value of this field is defined in 3GPP TS 45.008.
    Serving cell reporting
    If this structure is missing, this indicates that no valid measurement exist for the serving cell.
    Parameters RXLEV_VAL (6 bits), RX_QUAL_FULL (3 bits), MEAN_BEP (5 bits), CV_BEP (3 bits), NBR_RCVD_BLOCKS (5 bits) are defined in 3GPP TS 45.008.
    DTX_USED (1 bit field)
This bit indicates whether or not the mobile station used DTX during the previous measurement period.

-continued

0 DTX was not used
1 DTX was used.
 Neighbour cell reporting
 Repeated Invalid BSIC
This structure contains the report of cells with invalid BSIC.
BCCH-FREQ-NCELL (5 bits). This field represents the index of the BA (list), see 10.5.2.20.
BSIC (6 bits). Base station identity code of the corresponding index in the BA (list).
RXLEV (6 bits). GSM reporting quantity, see 3GPP TS 45.008.
 Bitmap type reporting:
This structure contains the report of cells with valid BSIC.
Each bit of the bitmap points to the corresponding index of the Neighbour Cell list defined in subclause 3.4.1.2.1.3 'Deriving the Neighbour Cell list from the GSM Neighbour Cell list and the 3G Neighbour Cell list'.
 If this structure is present and more bits than needed are available at the end of the message, the MS shall set the value of the redundant bitmap positions to '0'.
 At least 96 neighour cell entries shall be encoded in the bitmap.
 If this structure is present, some remaining bits indicating no report at the end of the message may be omitted if these bits do not fit into the message. This shall not lead to an error in the receiver of that message.
 REPORTING_QUANTITY (6 bits):
Measurement quantities are defined in 3GPP TS 45.008.

The EMR message is defined to be sent from the mobile station to the network to report enhanced measurement results. The Enhanced Measurement Report (EMR) message structure (see 3GPP TS 44.018 and FIG. 2 herein) does not allow extensions, specifically if the neighbor cell list is overly long (from GERAN and UTRAN cells). On the SACCH the Enhanced Measurement Report message cannot be segmented.

Another standards document that is of interest herein is 3GPP TS 44.060 V8.0.0 (2008-03) Technical Specification 3rd Generation Partnership Project; Technical Specification Group GSM/EDGE Radio Access Network; General Packet Radio Service (GPRS); Mobile Station (MS)-Base Station System (BSS) interface; Radio Link Control/Medium Access Control (RLC/MAC) protocol (Release 8). Of particular interest is subclause 11.2.9d "Packet Enhanced Measurement Report", attached hereto as Exhibit D and incorporated by reference, as is the entirety of 3GPP TS 44.060 V8.0.0.

The problems inherent in the Enhanced Measurement Report message of 3GPP TS 44.018 are also of concern to the Packet Enhanced Measurement Report message of 3GPP TS 44.060.

As was noted above, in general there is an interest to avoid changes if possible to existing signaling messages. However, in that message extensions are not in practice feasible for the EMR message, a new message would need to be defined for reporting E-UTRAN measurement results.

BRIEF DESCRIPTION OF THE DRAWINGS

In the attached Drawing Figures:
FIG. 1 reproduces Figure 10.5.2.20.1, "Measurement Results information element" of 3GPP TS 44.018.
FIG. 2 reproduces Figure 9.1.55.1. "Enhanced Measurement Report message content" of 3GPP TS.44018.

DETAILED DESCRIPTION

The exemplary embodiments of this invention provide in one aspect thereof an ability to report (from the UE) and interpret (at the BS) E-UTRAN cell measurement results using the GERAN Measurement Report message as in 3GPP TS 44.018.

The exemplary embodiments of this invention provide in a further aspect thereof an ability to report (from the UE) and interpret (at the BS) E-UTRAN cell measurement results using the GERAN Enhanced Measurement Report message as in 3GPP TS 44.018.

The exemplary embodiments of this invention provide in another aspect thereof an ability to report (from the UE) and interpret (at the BS) E-UTRAN cell measurement results using the GERAN Packet Measurement Report message as in 3GPP TS 44.060.

The exemplary embodiments of this invention provide in a further aspect thereof an ability to report (from the UE) and interpret (at the BS) E-UTRAN cell measurement results using the GERAN Packet Enhanced Measurement Report message as in 3GPP TS 44.060.

Figure 3:
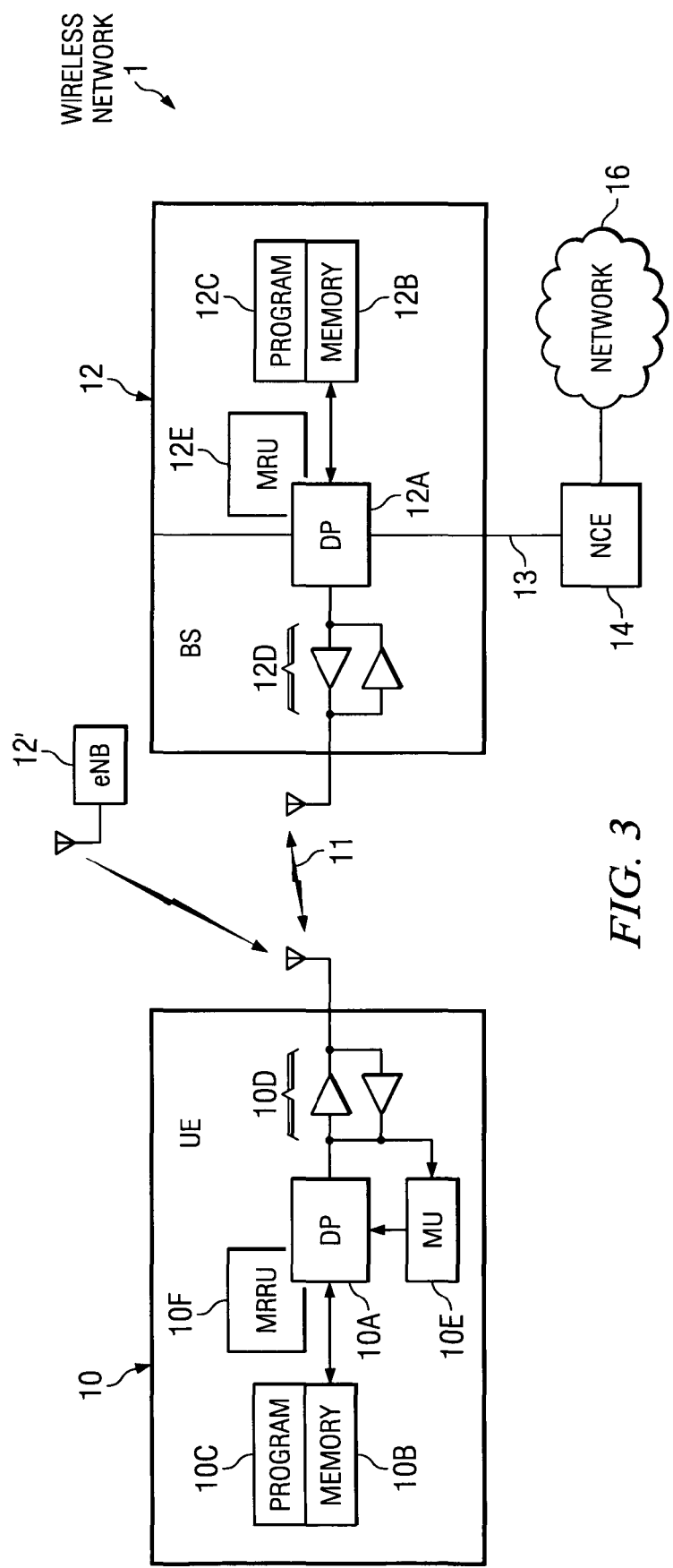
FIG. 3 shows a simplified block diagram of various electronic devices that are suitable for use in practicing the exemplary embodiments of this invention.

Reference is made first to FIG. 3 for illustrating a simplified block diagram of various electronic devices that are suitable for use in practicing the exemplary embodiments of this invention. In FIG. 3 a wireless network 1 is adapted for communication with an apparatus, such as a mobile communication device which may be referred to without loss of generality as a MS 10 or as a UE 10, via a network access node, such as a BSC or a Node B (more simply a base station (BS 12)). The network 1 may include a network control element (NCE) 14 that provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF)

transceiver 10D for bidirectional wireless communications 11 with the BS 12 via one or more antennas. The BS 12 also includes a DP 12A, a MEM 12B that stores a PROG 12C, and a suitable RF transceiver 12D. The BS 12 is coupled via a data path 13 to the NCE 14. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the BS 12, or by hardware, or by a combination of software and hardware.

For the purposes of describing the exemplary embodiments of this invention the UE 10 may be assumed to also include a measurement unit (MU) 10E and a measurement result reporting unit (MRRU) 10F, and the BS 12 includes a measurement result unit (MRU) 12E configured to receive measurement results from the MRRU 10F of the UE 10. The MRU 12E may use the reported measurement results when making handover (HO) and other decisions for the UE 10. There will typically be a plurality of neighbor BSs 12 that can be measured by the UE 10, and some of these may be E-UTRAN eNBs 12'. Note that the BS 12 in FIG. 3 may be considered to be a GERAN-compatible BS, and that the UE 10 may be capable of making both GERAN and E-UTRAN (and possibly also UTRAN) cell measurements.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multi-core processor architecture, as non-limiting examples.

In accordance with first exemplary embodiments of this invention EUTRAN neighbor cell measurements are reported by the UE 10 using the existing GERAN MEASUREMENT REPORT message (FIG. 1) by:

reserving at least one BA index value to indicate the EUTRAN center frequency of the reported cell (one BA index may be sufficient in most cases, but more generally one BA index value per EUTRAN center frequency may be used), reporting the EUTRAN neighbor cell measurement result with 3 bits, and reporting the EUTRAN cell PLCID (9 bits), along with the 3-bit measurement result, in the 12 bits of available space in the GERAN BSIC and RXLEV fields.

Figure 4:
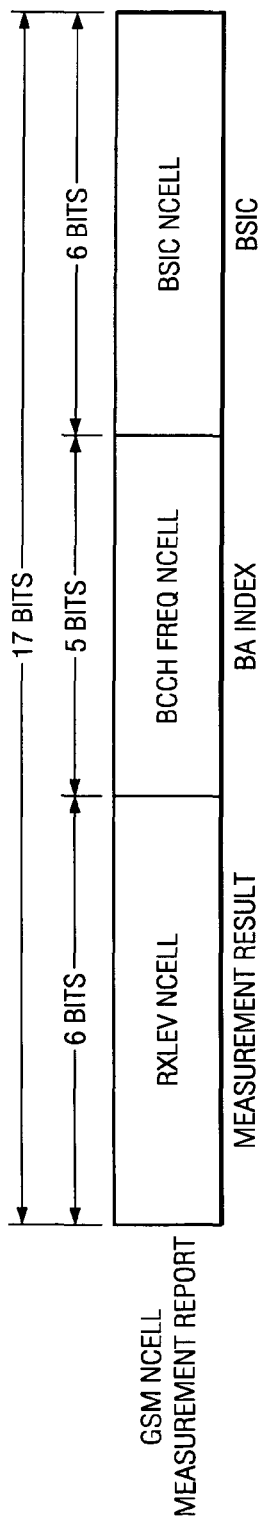
FIG. 4 shows GSM Ncell reporting in the Measurement Report message.
Figure 5:
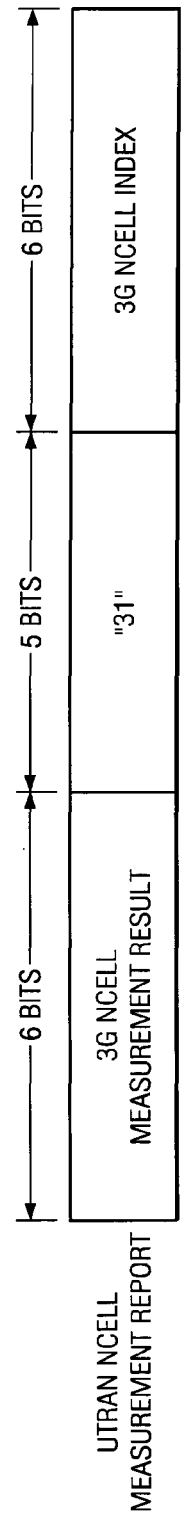
FIG. 5 shows 3G (UTRAN) Ncell reporting in the Measurement Report message.
Figure 6:
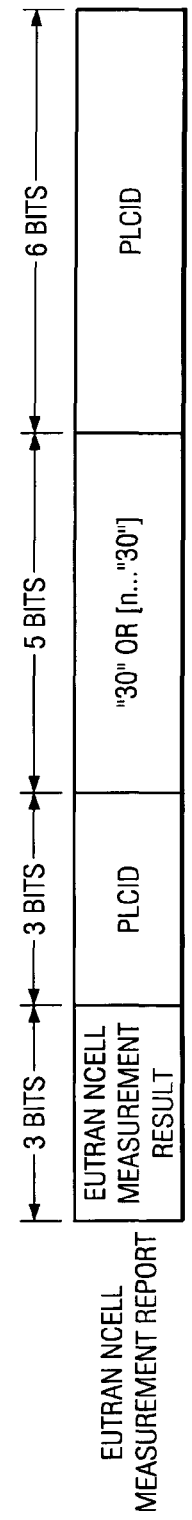
FIG. 6 shows E-UTRAN Ncell reporting in the Measurement Report message in accordance with exemplary embodiments of this invention.

The advantages made possible by this approach may be further appreciated by contrasting FIGS. 4 and 5 with FIG. 6. FIG. 4 shows the conventional GSM Ncell reporting in the Measurement Report message (using 17 bits per report). FIG. 5 shows 3G (UTRAN) Ncell reporting in the Measurement Report message. In this case if no more than 31 GSM ARFCN frequencies are included in the BA (list), the index BCCH Freq Ncell "31" indicates a measurement report corresponding to a 3G (UTRAN) cell. That is, BA Index "31" is reserved to identify a 3G Ncell report when less than 32 GSM ARFCN frequencies are included in the BA list.

FIG. 6 shows E-UTRAN Ncell reporting in the Measurement Report message in accordance with first exemplary embodiments of this invention. In this case if no more than n (or n=30) GSM ARFCN frequencies are included in the BA (list), the indices BCCH Freq Ncell [n . . . 30] indicate that the measurement report corresponds to an EUTRAN cell. That is, the BA indices [n . . . 30] are reserved to identify an EUTRAN cell report when less than n GSM ARFCN frequencies are included in the BA list. Each "n" corresponds to a given E-UTRAN center frequency. There are then 12 remaining bits for indicating the measurement result (3 bits) and the PLCID (9 bits).

This approach thus enables the Measurement Report message to provide results for GSM cells, UTRAN (3G) cells and E-UTRAN cells, with no change being needed in the Measurement Report message.

It should be noted that if no UTRAN cells are provided in NCL, then the BA Index of 31 may be used for E-UTRAN as well.

These exemplary embodiments can be applied in a similar fashion to the Packet Measurement Report message, where instead of the 5-bit BCCH_FREQ_NCELL field, a 6-bit FREQUENCY_N field is used, some values of which may be reserved to indicate EUTRAN cells (one value "n" may be reserved to a given E-UTRAN center frequency), and the 3-bit measurement result and 9-bit PLCID would fit in the 6-bit BSIC_N and 6-bit RXLEV_N fields of that message. Reference in this regard may be made to the subclause 11.2.9 "Packet Measurement Report" of 3GPP TS 44.060 V8.0.0, attached hereto as Exhibit D.

In accordance with second exemplary embodiments of this invention the EUTRAN neighbor cell measurements are reported by the UE 10 using the existing GERAN enhanced measurement report (EMR) message (FIG. 2) by:

reserving at least one BA index (BCCH_FREQ_NCELL) value in the Repeated Invalid BSIC Information struct to indicate the EUTRAN center frequency of the reported cell (one BA index may be sufficient in most cases, but more generally one BA index value per EUTRAN center frequency may be used), and reporting EUTRAN measurement results within the "Repeated Invalid BSIC information struct" of the EMR message, by reporting the EUTRAN neighbor cell measurement result with 3 bits, and reporting the EUTRAN cell PLCID, along with the 3 bit result, in the 12 available bits of the GERAN BSIC and RXLEV_NCELL fields of the invalid BSIC structure).

Note that in many cases it may be that the EUTRAN center frequency would be the same for all reported EUTRAN cells.

This embodiment may be applied in exactly the same fashion to the Packet Enhanced Measurement Report message, by reusing the Repeated Invalid BSIC Information struct as disclosed above. Reference in this regard may be made to the subclause 11.2.9d "Packet Enhanced Measurement Report" of 3GPP TS 44.060 V8.0.0, attached hereto as Exhibit D.

It is within the scope of these first and second exemplary embodiments to extend the dynamic range of the measurement results (reported with 3 bits) in a semi-dynamic manner by using an offset parameter that is sent with (DL) system information. The granularity of the 3-bit measurement result may also be controlled with a DL parameter. As an example, a 2 dB granularity may be used for measurement result reporting, covering essentially a 14 dB range. The DL parameter may be used to indicate an absolute start value for the 14 dB range. The offset thus may have a granularity of 1 dB to 4 dB and a range of 32 dB to 64 dB, as non-limiting examples. Note that the use of the dynamic range extension and granularity are optional, and are not needed in order to implement the exemplary embodiments of this invention as described above.

The offset value may remain fixed over a call, or throughout the network. A dynamic change in the measurement result, even during a call, can be handled if the transient is accommodated (since the offset is delivered through unacknowledged signaling).

In these exemplary embodiments the pre-existing Measurement Report message formats can be used for E-UTRAN reporting, where the reporting of one E-UTRAN cell consumes an equal amount of space in the report message as does the reporting of a single GERAN or a single UTRAN cell.

Note that while the foregoing embodiments (see FIG. 6) show the 3-bit measurement result and 3 bits of the 9-bit PLCID being placed into the 6-bit RXLEV field, and the remaining 6 bits of the PLCID are placed into the 6-bit BSIC field, in other embodiments other arrangements and bit placements could be used.

Based on the foregoing it should be apparent that the exemplary embodiments of this invention provide a method, apparatus and computer program(s) to report a result of an EUTRAN cell measurement in a GERAN Measurement Report message.

Based on the foregoing it should be apparent that the exemplary embodiments of this invention provide a method, apparatus and computer program(s) to report a result of an EUTRAN cell measurement in a GERAN Packet Measurement Report message.

Based on the foregoing it should be apparent that the exemplary embodiments of this invention also provide a method, apparatus and computer program(s) to report a result of an EUTRAN cell measurement in a GERAN Enhanced Measurement Report message.

Based on the foregoing it should be apparent that the exemplary embodiments of this invention also provide a method, apparatus and computer program(s) to report a result of an EUTRAN cell measurement in a GERAN Packet Enhanced Measurement Report message.

Based on the foregoing it should be apparent that the exemplary embodiments of this invention also provide a method, apparatus and computer program(s) to receive a result of an EUTRAN cell measurement in a GERAN Measurement Report message.

Based on the foregoing it should be apparent that the exemplary embodiments of this invention also provide a method, apparatus and computer program(s) to receive a result of an EUTRAN cell measurement in a GERAN Packet Measurement Report message.

Based on the foregoing it should be apparent that the exemplary embodiments of this invention also provide a method, apparatus and computer program(s) to receive a result of an EUTRAN cell measurement in a GERAN Enhanced Measurement Report message.

Based on the foregoing it should be apparent that the exemplary embodiments of this invention also provide a method, apparatus and computer program(s) to receive a result of an EUTRAN cell measurement in a GERAN Packet Enhanced Measurement Report message.

Based on the foregoing it should be apparent that the exemplary embodiments of this invention further provide a method, apparatus and computer program(s) to receive an offset value from a wireless network node for use in changing the dynamic range of the reported measurement result.

(A) Based on the foregoing it should be further apparent that the exemplary embodiments of this invention provide a method, apparatus and computer program(s) to place a result of an EUTRAN cell measurement into a message used for measurement reporting, and to report the EUTRAN cell measurement result in the message used for measurement reporting.

(B) The method, apparatus and computer program(s) of the preceding paragraph, where the message used for measurement reporting comprises one of a GERAN Measurement Report message or a GERAN Enhanced Measurement Report message.

(C) The method, apparatus and computer program(s) of the preceding paragraph, comprising when using a GERAN Measurement Report message placing an indication of a corresponding EUTRAN center frequency in a 5-bit BA Index field and by placing a 3-bit measurement result and a 9-bit physical layer cell identification into 6-bit RXLEV field and a 6-bit BSIC field, and further comprising when using the Enhanced Measurement Report message placing an indication of the corresponding EUTRAN center frequency, the 3-bit measurement result and the 9-bit physical layer cell identification into an Invalid BSIC Information structure.

(D) The method, apparatus and computer program(s) of paragraph (A), where the message used for measurement reporting comprises one of a GERAN Packet Measurement Report message or a GERAN Packet Enhanced Measurement Report message.

Figure 7:
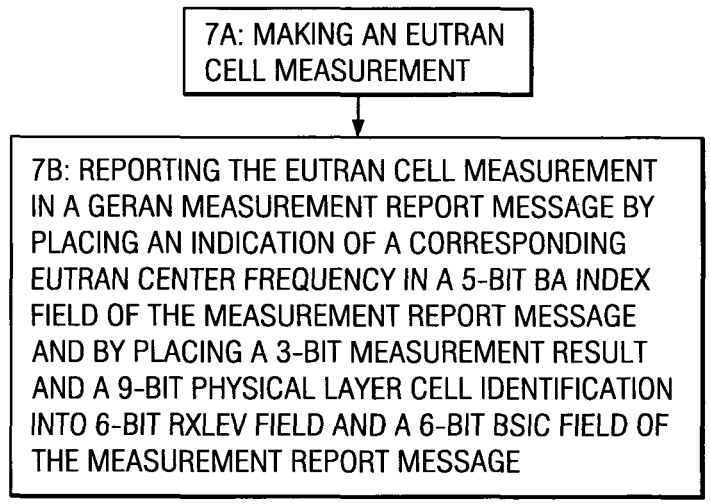
FIG. 7 is a logic flow diagram that illustrates the operation of a method, and a result of execution of computer program instructions, in accordance with the exemplary embodiments of this invention.

FIG. 7 is a logic flow diagram that illustrates the operation of a method, and a result of execution of computer program instructions, in accordance with the exemplary embodiments of this invention. At Block 7A a mobile apparatus makes an EUTRAN cell measurement, and at Block 7B the mobile apparatus reports the EUTRAN cell measurement in a GERAN Measurement Report message by placing an indication of a corresponding EUTRAN center frequency in a 5-bit BA Index field of the Measurement Report message and by placing a 3-bit measurement result and a 9-bit physical layer cell identification into 6-bit RXLEV field and a 6-bit BSIC field of the Measurement Report message.

The method and computer programs as in the preceding paragraphs, where the 3-bit measurement result and 3 bits of the 9-bit physical layer cell identification are placed into the 6-bit RXLEV field, and where the remaining 6 bits of the physical layer cell identification are placed into the 6-bit BSIC field.

The method and computer programs as in the preceding paragraphs, where the 3-bit measurement result is referenced to at least one of an offset parameter and a granularity parameter that is signaled to the mobile apparatus.

Also described herein is an apparatus configured to make an EUTRAN cell measurement and to report the EUTRAN cell measurement in a GERAN Measurement Report message by placing an indication of a corresponding EUTRAN center frequency in a 5-bit BA Index field of the Measurement Report message and by placing a 3-bit measurement result and a 9-bit physical layer cell identification into 6-bit RXLEV field and a 6-bit BSIC field of the Measurement Report message.

The apparatus as in the preceding paragraph, comprising a wireless transceiver and a controller.

Figure 8:
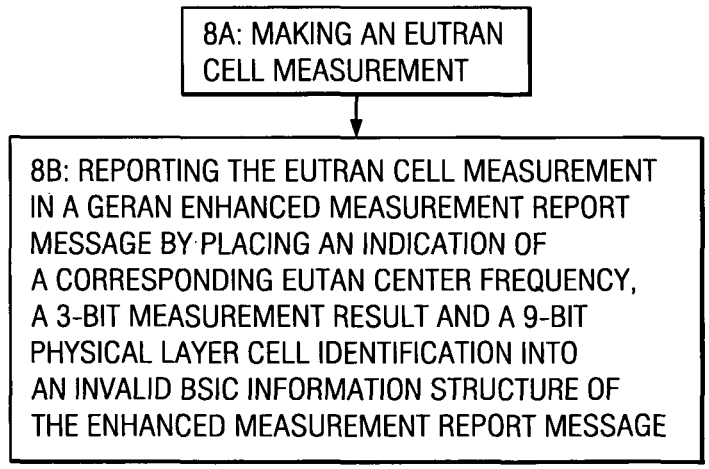
FIG. 8 is a logic flow diagram that illustrates the operation of a method, and a result of execution of computer program instructions, further in accordance with the exemplary embodiments of this invention.

Referring to FIG. 8, also provided herein is a method that comprises at Block 8A making an EUTRAN cell measurement with a mobile apparatus, and at Block 8B the mobile apparatus reports the EUTRAN cell measurement in a GERAN Enhanced Measurement Report message by placing an indication of a corresponding EUTRAN center frequency, a 3-bit measurement result and a 9-bit physical layer cell identification into an Invalid BSIC Information structure of the Enhanced Measurement report message.

Note that the various blocks shown in FIGS. 7 and 8 may be viewed as method steps, and/or as operations that result from operation of computer program code, and/or as a plurality of coupled logic circuit elements constructed to carry out the associated function(s).

Also described herein is an apparatus that comprises means for making an EUTRAN cell measurement and means for reporting the EUTRAN cell measurement in a GERAN Measurement Report message by placing an indication of a corresponding EUTRAN center frequency in a 5-bit BA Index field of the Measurement Report message and by placing a 3-bit measurement result and a 9-bit physical layer cell identification into 6-bit RXLEV field and a 6-bit BSIC field of the Measurement Report message.

Also described herein is an apparatus that comprises means for making an EUTRAN cell measurement and means for reporting the EUTRAN cell measurement in a GERAN Enhanced Measurement Report message by placing an indication of a corresponding EUTRAN center frequency, a 3-bit measurement result and a 9-bit physical layer cell identification into an Invalid BSIC Information structure of the Enhanced Measurement report message.

The various embodiments also encompass a wireless network node, such as a base station, that is configured to receive at least one of a GERAN Measurement Report message, a GERAN Enhanced Measurement Report message, a GERAN Packet Measurement Report message and a GERAN Packet Enhanced Measurement Report message, and to recognize and extract EUTRAN neighbor cell measurement report information there from.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN LTE), GERAN and GPRS systems, it should be appreciated that the exemplary embodiments of this invention are not limited for use with only these particular types of wireless communication systems, and that they may be used to advantage with other types of wireless communication systems when it is desired to provide interworking with respect to reporting cell measurement results.

For example, while described in the context of reporting EUTRAN cell information, the exemplary embodiments may be applied as well to other existing and future wireless communication systems (e.g., modified/next "EUTRAN") interworking with GERAN. In these cases there may be other than 9 bits for the PLCID (or equivalent information) and 3 bits for measurement results (e.g., k bits of PLCID (e.g., k=8) and m bits of measurement result (e.g., m=4)), and the exemplary embodiments of this invention may still be used for accommodating the neighbor cell measurement reporting using the existing GERAN measurement result reporting message structures and formats.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
placing an indication of a wireless communication system cell measurement in a measurement report message, wherein the indication includes a corresponding frequency index, and where said measurement report message comprises a first part and a second part of an m-bit value representing a physical layer cell identification in a first and a second field, respectively, and a k-bit value representing a measurement result in the second field corresponding to the frequency index, wherein m and k are whole numbers, wherein the frequency index is a broadcast control channel allocation index, and wherein the first field is a base station identity code field and the second field is a received signal level field; and
sending the measurement report message towards a network interface.

2. The method as in claim 1, wherein the measurement report message comprises a global system for mobile communications/enhanced data rates for global evolution radio access network measurement report.

3. The method as in claim 2, wherein the global system for mobile communications/enhanced data rates for global evolution radio access network measurement report is a global system for mobile communications/enhanced data rates for global evolution radio access network measurement report.

4. The method as in claim 1, wherein the wireless communication system is an evolved universal terrestrial radio access network.

5. The method as in claim 1, wherein the first part and the second part of the m-bit value has a combined length of 9 bits, and wherein the k-bit value has a length of 3 bits.

6. The method as in claim 1, comprising transmitting the measurement report.

7. A non-transitory computer memory embodying a computer program executable to
place an indication of a wireless communication system cell measurement in a measurement report message, wherein the indication includes a corresponding frequency index, and where said measurement report message comprises a first part and a second part of an m-bit value representing a physical layer cell identification in a first and a second field, respectively, and a k-bit value representing a measurement result in the second field corresponding to the frequency index, wherein m and k are whole numbers, wherein the frequency index is a broadcast control channel allocation index, and wherein the first field is a base station identity code field and the second field is a received signal level field; and
send the measurement report message towards a network interface.

8. An apparatus, comprising:
at least one processor; and
at least one non-transitory memory including computer program code,
the at least one memory and the computer program code configured to, with the at least one processor, cause the apparatus at least to perform:
place an indication of a wireless communication system cell measurement in a measurement report message, wherein the indication includes a corresponding frequency index, and where said measurement report message comprises a first part and a second part of an m-bit value representing a physical layer cell identification in a first and a second field, respectively, and a k-bit value representing a measurement result in the second field corresponding to the frequency index, wherein m and k are whole numbers, wherein the frequency index is a broadcast control channel allocation index, and wherein the first field is a base station identity code field and the second field is a received signal level field; and
send the measurement report message towards a network interface.

9. The apparatus as in claim 8, wherein the measurement report message comprises a global system for mobile communications/enhanced data rates for global evolution radio access network measurement report.

10. The apparatus as in claim 9, wherein the global system for mobile communications/enhanced data rates for global evolution radio access network measurement report is a global system for mobile communications/enhanced data rates for global evolution radio access network measurement report.

11. The apparatus as in claim 8, wherein the wireless communication system is an evolved universal terrestrial radio access network.

12. The apparatus as in claim 8, wherein the first part and the second part of the m-bit value has a combined length of 9 bits, and wherein the k-bit value has a length of 3 bits.

13. The apparatus as in claim 8, the at least one non-transitory memory and the computer program code further configured to transmit the measurement report sent to the network interface.

14. A method comprising,
receiving a measurement report message comprising an indication of a wireless communication system cell measurement, wherein the indication includes a corresponding frequency index, and where said measurement report message comprises a first part and a second part of an m-bit value representing a physical layer cell identification in a first and a second field, respectively, and a k-bit value representing a measurement result in the second field corresponding to the frequency index, wherein m and k are whole numbers, wherein the frequency index is a broadcast control channel allocation index, and wherein the first field is a base station identity code field and the second field is a received signal level field; and
using the received measurement report in performing a handover.

15. The method as in claim 14, wherein the measurement report comprises a global system for mobile communications/enhanced data rates for global evolution radio access network measurement report.

16. The method as in claim 14, wherein the wireless communication system is an evolved universal terrestrial radio access network.

17. The method as in claim 14, wherein the first part and the second part of the m-bit value has a combined length of 9 bits, and wherein the k-bit value has a length of 3 bits.

18. An apparatus, comprising:
at least one processor; and
at least one non-transitory memory including computer program code,
the at least one memory and the computer program code configured to, with the at least one processor, cause the apparatus at least to perform:
receive a measurement report message comprising an indication of a wireless communication system cell measurement, wherein the indication includes a corresponding frequency index, and where said measurement report message comprises a first part and a second part of an m-bit value representing a physical layer cell identification in a first and a second field, respectively, and a k-bit value representing a measurement result in the second field corresponding to the frequency index, wherein m and k are whole numbers, wherein the frequency index is a broadcast control channel allocation index, and wherein the first field is a base station identity code field and the second field is a received signal level field; and
use the received measurement report in performing a handover.

19. The apparatus as in claim 18, wherein the measurement report comprises a global system for mobile communications/enhanced data rates for global evolution radio access network measurement report.

20. The apparatus as in claim 18, wherein the wireless communication system is an evolved universal terrestrial radio access network.

21. The apparatus as in claim 18, wherein the first part and the second part of the m-bit value has a combined length of 9 bits, and wherein the k-bit value has a length of 3 bits.

* * * * *